United States Patent
Fu

(10) Patent No.: US 10,153,947 B2
(45) Date of Patent: Dec. 11, 2018

(54) METHOD, DEVICE AND SYSTEM FOR PREVENTING NETWORK NODE AGING

(71) Applicant: ZTE CORPORATION, Shenzhen (CN)

(72) Inventor: Zhitao Fu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 235 days.

(21) Appl. No.: 15/303,363

(22) PCT Filed: Aug. 14, 2014

(86) PCT No.: PCT/CN2014/084377
§ 371 (c)(1),
(2) Date: Oct. 11, 2016

(87) PCT Pub. No.: WO2015/154357
PCT Pub. Date: Oct. 15, 2015

(65) Prior Publication Data
US 2017/0041196 A1 Feb. 9, 2017

(30) Foreign Application Priority Data
Apr. 9, 2014 (CN) .......................... 2014 1 0140723

(51) Int. Cl.
*H04L 12/24* (2006.01)

(52) U.S. Cl.
CPC .............. *H04L 41/12* (2013.01); *H04L 41/00* (2013.01); *H04L 41/14* (2013.01)

(58) Field of Classification Search
CPC .......... H04L 41/12; H04L 41/00; H04L 41/14
See application file for complete search history.

(56) References Cited

U.S. PATENT DOCUMENTS 8,170,189 B2 * 5/2012 Alperin ................. H04M 3/465
370/352
8,966,318 B1 * 2/2015 Shah .................... G06F 11/3664
714/28
(Continued)

FOREIGN PATENT DOCUMENTS

CN         101094186 A    12/2007
CN         101420378 A     4/2009
(Continued)

OTHER PUBLICATIONS

International Search Report and Written Opinion from PCT/CN2014/084377 dated Jan. 21, 2015.
(Continued)

*Primary Examiner* — Michael A Keller
(74) *Attorney, Agent, or Firm* — Calfee Halter & Griswold LLP

(57) ABSTRACT

The embodiments of the present disclosure disclose a method, a device and a system for preventing network node aging. The method includes: analyzing whether a control plane of a first node exits a Hello detection function due to malfunction; adding a specific identification to first interaction information in the case that the control plane of the first node is not malfunctioned but exits the Hello detection function, the specific identification being used to indicate the state that the control plane is not malfunctioned but exits the Hello detection function; and sending the first interaction information to a second node neighboring the first node, so that the second node determines that the control plane of the first node is not malfunctioned but exits the Hello detection function via the specific identification, and continues to send a refresh message to the first node.

11 Claims, 4 Drawing Sheets

(56) References Cited

U.S. PATENT DOCUMENTS

| | | | |
|---|---|---|---|
| 2007/0053359 A1* | 3/2007 | Wu | H04J 3/14 |
| | | | 370/392 |
| 2009/0080450 A1* | 3/2009 | Xiao | H04L 12/66 |
| | | | 370/410 |
| 2009/0086623 A1* | 4/2009 | Gao | H04L 41/0654 |
| | | | 370/221 |
| 2010/0281155 A1* | 11/2010 | Cipollone | G06F 11/3013 |
| | | | 709/224 |
| 2014/0029413 A1* | 1/2014 | Jain | H04L 41/0668 |
| | | | 370/221 |
| 2015/0222638 A1* | 8/2015 | Morley | G06F 21/105 |
| | | | 726/28 |

FOREIGN PATENT DOCUMENTS

| | | |
|---|---|---|
| CN | 101741738 A | 6/2010 |
| CN | 2014/084377 | 1/2015 |
| EP | 1753182 A1 | 2/2007 |

OTHER PUBLICATIONS

Ji, et al., "A Comparison of Hard-State and Soft-State Signaling Protocols", ACM Transactions on Networking, vol. 15, No. 2, Apr. 2007, pp. 281-294.

Wu et al., "Recovery from Control Plant Failures in the RSVP-TE Signaling Protocol" Computer Communications, vol. 34 No. 16, Jun. 2011, pp. 1956-1967.

European Search Report to European Patent Application No. 14888669, dated Oct. 20, 2017, 11 pages.

* cited by examiner

US 10,153,947 B2

METHOD, DEVICE AND SYSTEM FOR PREVENTING NETWORK NODE AGING

CROSS-REFERENCE TO RELATED APPLICATIONS

The present application is the US national phase of PCT application PCT/CN2014/084377, filed on Aug. 14, 2014, which is based on and claims priority to Chinese Patent Application No. 201410140723.1, filed on Apr. 9, 2014, the entire contents of which are incorporated herein by reference.

TECHNICAL FIELD

The present disclosure relates to the fields of resource reservation protocol-traffic engineer (RSVP-TE) graceful restart (GR) technologies in data network communications, and more particularly, to a method, a device and a system for preventing network node aging.

BACKGROUND

RSVP-TE is a traffic engineer technology based on multiple protocol label switching (MPLS). The RSVP-TE traffic engineer technology implements forwarding of the flow traffic in a TE (Traffic Engineer, traffic engineer) tunnel through information issuance, path calculation, signaling interaction and traffic forwarding. A GR technology based on RSVP-TE provides a non-stop forwarding (NSF) application of the flow traffic. With regard to a network possessing the GR technology, when a control plane having a node equipment is malfunctioned, the information of the control plane of the node equipment may be restored through a neighboring node equipment of the node equipment, and the forwarding information of the node equipment can also be reserved at the restoration phase of the information of the control plane thereof, so as to ensure that the flow traffic is forwarded. The GR technology is implemented on the basis of Hello detection, and one object of the Hello detection is to sense that the neighboring node equipment is restarted. The usage rules and extended functions of the Hello detection are introduced in RFC3209, RFC3473 and RFC5063.

As shown in FIG. 1, the interaction and effect of the Hello detection in the GR technology are as follows. 1. if all the three nodes R1, R2 and R3 support the GR technology, a normal Hello neighboring relationship is established among R1 and R2, and R2 and R3, and the respective restart time is interacted through a Hello message. 2. when a control plane of R2 is restarted, R1 and R3 cannot receive the Hello message sent by R2 within a period, then R1 and R3 will consider that the control plane of R2 may be restarted possibly, and then enable a restart timer of the control plane of R2; and meanwhile, both R1 and R3 suppress to send a refresh message to R2. 3. after the control plane of R2 is restarted, a Hello message is sent to R1 and R3, and a recovery time (Recovery time) is carried in the Hello message; after R1 and R3 receive the Hello message carrying the recovery time, because a source instance (instance) is inconsistent with a source instance before restart and the recovery time is carried, R1 and R3 confirm that R2 is restarted; and R1 and R3 may help R2 to restore the information of the control plane thereof before restart within the recovery time.

The manner of helping the neighboring node to restore the information of the control plane before restart has the defects that: if the Hello detection of R2 is disabled, then the neighboring nodes R1 and R3 of R2 sense the loss of the Hello message; according to the protocol instruction of RFC3473, R1 and R3 need to wait for a period of time which is namely the restart time; and meanwhile, R1 and R3 suppress to send the refresh message to R2. However, the control plane of R2 is not restarted, but exits the Hello detection only. During the period of waiting for the restart of R2, because neither R1 nor R3 will send the refresh message to R2, the aging of R2 is caused.

The contents above are used to assist understanding the technical solutions of the present disclosure, and are not intended to recognize that the contents above are the prior arts.

SUMMARY

The main object of the embodiments of the present disclosure is to provide a method, a device and a system for preventing network node aging, which can effectively prevent network node aging.

In order to implement the foregoing object, the embodiment of the present disclosure provides a method, a device and a system for preventing network node aging. The method includes:

analyzing whether a control plane of a first node exits a Hello detection function due to malfunction;

adding a specific identification to first interaction information when the control plane of the first node is not malfunctioned but exits the Hello detection function, the specific identification being used to indicate that the control plane is not malfunctioned but exits the Hello detection function; and sending the first interaction information to a second node neighboring the first node, so that the second node determines that the control plane of the first node is not malfunctioned but exits the Hello detection function via the specific identification, and continues to send a refresh message to the first node.

Preferably, the method further includes:

receiving second interaction information from a third node and including the specific identification;

determining that a control plane of the third node is not malfunctioned but exits the Hello detection function according to the second interaction information; and continuing to send the refresh message to the third node.

Preferably, after the sending the first interaction information to the second node neighboring the first node, the method further includes:

receiving the first interaction information including the specific identification;

determining that the control plane of the node is not malfunctioned but exits the Hello detection function according to the first interaction information; and continuing to send the refresh message to the first node.

Preferably, the method further includes:

when the first interaction information not including the specific identification is sensed and received, analyzing whether preset type interaction information is received from the first node in a first preset time; and when the preset type interaction information is not received from the first node in the first preset time, determining that the control plane of the first node is malfunctioned, and stopping sending the refresh message to the first node.

Preferably, after the determining that the control plane of the first node is malfunctioned, and stopping sending the refresh message to the first node, the method further includes:

when the preset type interaction information is sensed and received from the first node, restoring to send the fresh message to the first node.

Preferably, the determining that the control plane of the first node is not malfunctioned but exits the Hello detection function and continuing to send the refresh message to the first node include:

determining whether the specific identification is corresponding to a content that the first node stops sending the preset type interaction information when a second preset time arrives; and determining that the specific identification is corresponding to the content that the first node stops sending the preset type interaction information when the second preset time arrives, determining that the control plane of the first node is not malfunctioned but exits the Hello detection function when the second preset time arrives, and continuing to send the refresh message to the first node.

Preferably, after the determining whether the specific identification is corresponding to a content that the first node stops sending the preset type interaction information when a second preset time arrives, the method further includes:

when determining that the specific identification is corresponding to a content that the first node already stops sending the preset type interaction information, determining that the control plane of the first node is not malfunctioned but exits the Hello detection function, and continuing to send the refresh message to the first node.

The embodiment of the present disclosure also provides a device for preventing network node aging, including:

an analysis module configured to analyze whether a control plane of a first node exits a Hello detection function due to malfunction;

an addition module configured to add a specific identification to first interaction information when the control plane of the first node is not malfunctioned but exits the Hello detection function, the specific identification being used to indicate that the control plane is not malfunctioned but exits the Hello detection function; and a first sending module configured to send the first interaction information to a second node neighboring the first node, so that the second node determines that the control plane of the first node is not malfunctioned but exits the Hello detection function via the specific identification, and continues to send a refresh message to the first node.

Preferably, the device further includes:

a receiving module configured to receive second interaction information from a third node and including the specific identification;

a determination module configured to determine that a control plane of the third node is not malfunctioned but exits the Hello detection function according to the second interaction information; and a second sending module configured to continue to send the refresh message to the third node.

The embodiment of the present disclosure also provides a system for preventing network node aging, including: at least two nodes, the nodes of the system including the device for preventing network node aging as described above.

The embodiment of the present disclosure also provides a computer program including program instructions which, when executed by device for preventing network node aging, causes the device to perform the method as described above.

The embodiment of the present disclosure also provides a carrier carrying the foregoing computer program.

According to the embodiments of the present disclosure, by analyzing whether the control plane of the first node exits the Hello detection function due to malfunction, the specific identification is added to the first interaction information in the case that the control plane of the first node is not malfunctioned but exits the Hello detection function, the specific identification being used to indicate the state that the control plane is not malfunctioned but exits the Hello detection function; and the first interaction information is sent to the second node neighboring the first node, so that the second node determines that the control plane of the first node is not malfunctioned but exits the Hello detection function via the specific identification, and continues to send the refresh message to the first node. When the first interaction information sent by the first node received includes the specific identification, the second node determines that the control plane of the first node is not malfunctioned but exits the Hello detection function, and continues to send the refresh message to the first node, so as to prevent the second node from initiating a restart timer and stopping sending the refresh message to the first node, so that aging of the first node is avoided.

Object implementation, functional features and advantages of the present disclosure will be further explained with reference to the embodiments and accompanying drawings.

PREFERRED EMBODIMENTS OF THE INVENTION

It should be understood that the specific embodiments described herein are only for explanation of the present disclosure, but are not intended to limit the present disclosure. Any combination of the above embodiments and the features in the embodiments may be employed in case of no conflict.

Figure 1:
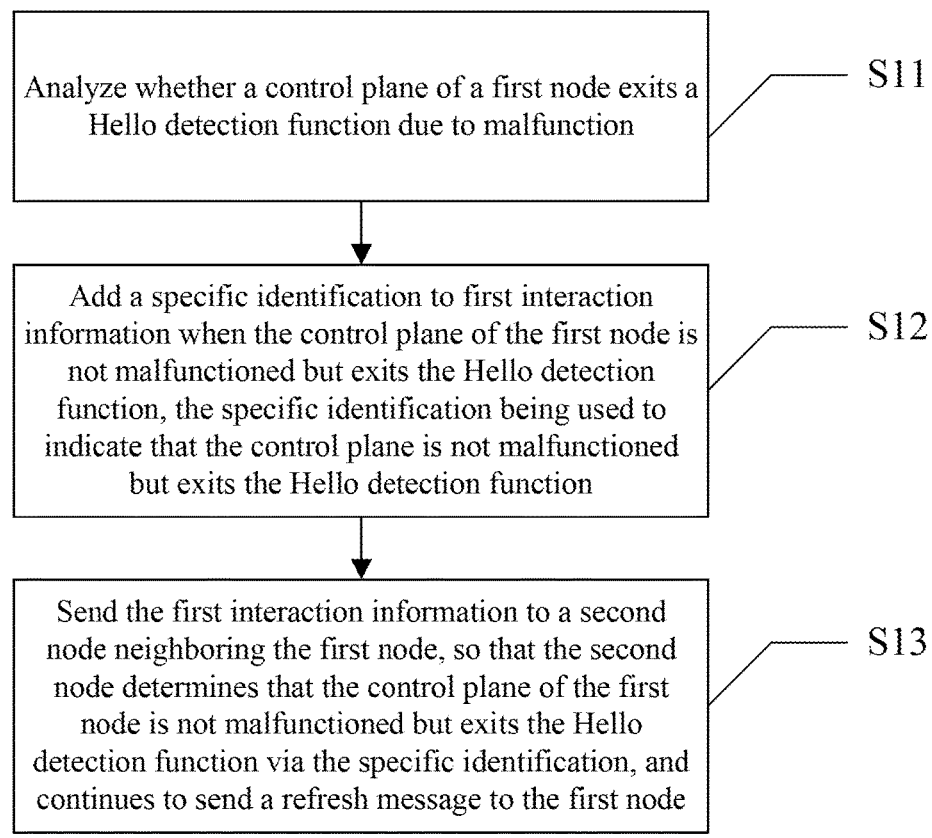
FIG. 1 is a flow diagram illustrating a method for preventing network node aging according to a first embodiment of the present disclosure.

FIG. 1 is a flow diagram illustrating a method for preventing network node aging according to a first embodiment of the present disclosure.

It should be emphasized that the flow chart as shown in FIG. 1 is only one preferred embodiment, and those skilled in the art will appreciate that any embodiment made in accordance with the idea of the disclosure shall not depart from the scope covered by the following technical solutions:

it is analyzed whether a control plane of a first node exits a Hello detection function due to malfunction; a specific identification is added to first interaction information in the case that the control plane of the first node is not malfunctioned but exits the Hello detection function, the specific identification being used to indicate the state that the control plane is not malfunctioned but exits the Hello detection function; and the first interaction information is sent to a second node neighboring the first node, so that the second node determines that the control plane of the first node is not malfunctioned but exits the Hello detection function via the specific identification, and continues to send a refresh message to the first node.

The specific steps of the embodiment for gradually implementing the object of preventing network node aging are as follows.

In step S11, it is analyzed whether a control plane of a first node exits a Hello detection function due to malfunction.

In the embodiment, a network is composed of each node, and various interconnected nodes are mutually neighboring. When each node has a GR function, and can send a Hello message to a neighboring node equipment thereof through enabling the Hello detection function, so as to inform the neighboring node equipment of a restart time thereof. When a control plane of a certain node is restarted, the information of the control plane before restart can be restored through the neighboring node equipment, so as to ensure that the flow traffic is forwarded. A body for executing the method for preventing network node aging of the embodiment of the present disclosure may either be the first node, or a control equipment communicated and connected with each node. In the embodiment, the first node is preferably selected as the executive body, and the first node analyzes whether the control plane of the first node exits the Hello detection function due to malfunction.

In step S12, a specific identification is added to first interaction information in the case that the control plane of the first node is not malfunctioned but exits the Hello detection function, the specific identification being used to indicate the state that the control plane is not malfunctioned but exits the Hello detection function.

In step S13, the first interaction information is sent to a second node neighboring the first node, so that the second node determines that the control plane of the first node is not malfunctioned but exits the Hello detection function via the specific identification, and continues to send a refresh message to the first node.

In the embodiment, when the control plane of the first node is not malfunctioned but exits the Hello detection function, the first node builds the first interaction information including the specific identification, and the specific identification is corresponding to the state that the control plane is not malfunctioned but exits the Hello detection function, and is corresponding to the state that the control plane of the first node is not malfunctioned but exits the Hello detection function herein. The first interaction information including the specific identification is sent to a neighboring second node equipment thereof. When the first interaction information is sensed and received from the first node, the second node analyzes whether the first interaction information includes the specific identification, i.e., analyzes whether the control plane of the first node equipment sending the first interaction information is not malfunctioned but exits the Hello detection function.

When the first interaction information includes the specific identification, i.e., the control plane of the first node is not malfunctioned but exits the Hello detection function, the second node continues to send the refresh message to the first node, so as to prevent the aging of the first node. The second node may either be one neighboring equipment of the first node, or may include multiple neighboring equipment of the first node. Similarly, the first node may also receive second interaction information from a third node and including the specific identification; determines that a control plane of the third node is not malfunctioned but exits the Hello detection function according to the second interaction information; and continues to send the refresh message to the third node, the specific identification being used to indicate the state that the control plane of the third node is not malfunctioned but exits the Hello detection function herein. The third node may either be other neighboring node of the second node excluding the second node, or the second node.

Figure 2:
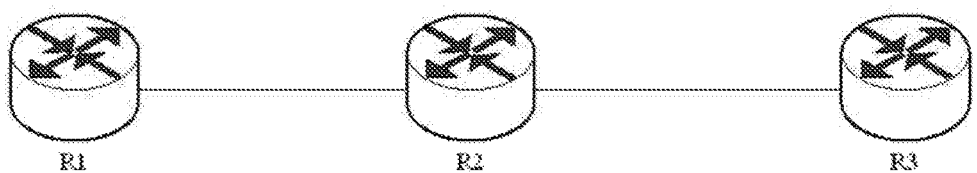
FIG. 2 is a schematic diagram illustrating node distribution of a network structure.
Figure 3:
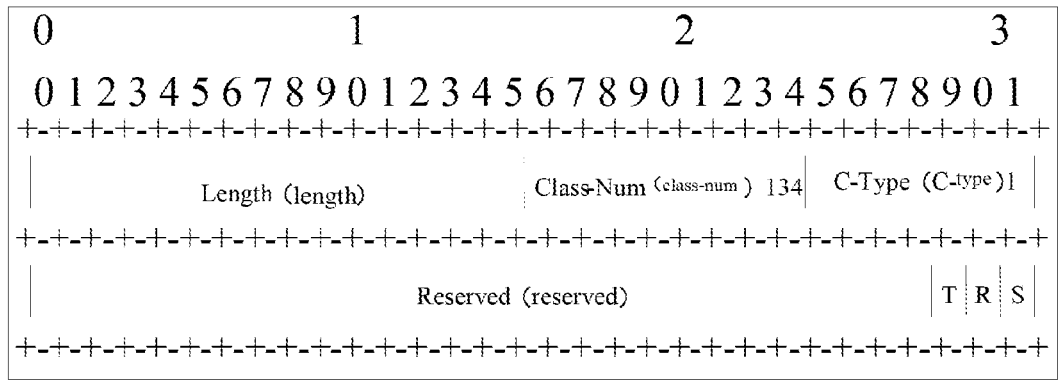
FIG. 3 is a schematic diagram illustrating a standard format of a Capability object in an RSVP Hello interaction message between network nodes according to an embodiment of the present disclosure.
Figure 4:
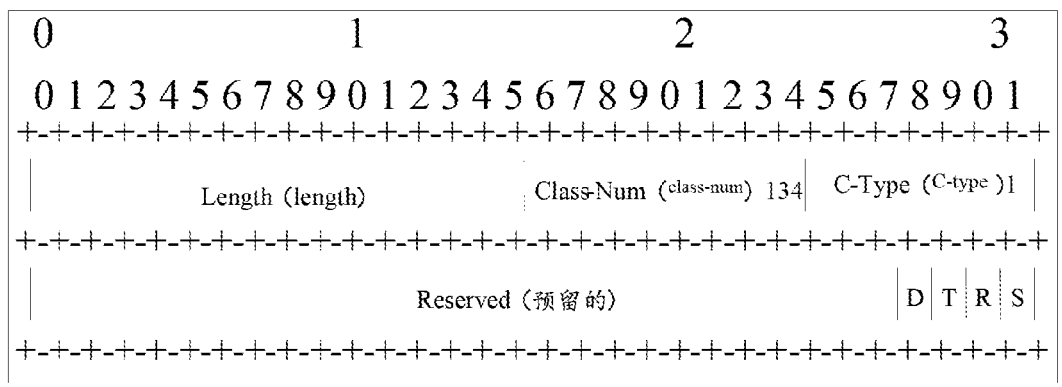
FIG. 4 is a schematic diagram illustrating a extended format of the Capability object in the RSVP Hello interaction message between the network nodes according to an embodiment of the present disclosure.

FIG. 2 illustrates a network structure composed of three nodes including R1, R2 and R3, where R1, R2 and R3 all have the GR function, R1 and R2 are neighboring node equipment to each other, while R2 and R3 are neighboring node equipment to each other. R1 and R2, as well as R2 and R3 inform the restart time of the respective control plane of the opposite node through sending interaction information of a preset type at an interval of a first preset time. When the control plane of R2 is restarted, the information of the control plane before restart may be restored through the neighboring node equipment R1 and R3. When the control plane of R2 is not malfunctioned but the Hello detection function is disabled, R2 builds interaction information, and adds a specific identification to the interaction information, the specific identification corresponding to a content that the Hello detection function is disabled. Taking the interaction information as a Hello message for example, a format of an RSVP Hello message for interaction between R1 and R2 as well as between R2 and R3 is: <Hello Message>::=<Common Header>[<INTEGRITY>]<HELLO>[<RESTART_CAP>][CAPABILITY]. The Hello message includes a Capability object. FIG. 3 is a schematic diagram illustrating a standard format of the Capability object. FIG. 4 is a schematic diagram illustrating an extended format of the Capability object. One Bit field D is reserved for the extended Capability object. In a normal Hello message, the default value of the field D is 0. When the R2 disables/exits the Hello detection function, the value of the field D in the Capability object of the Hello message is modified as 1, and a Hello message of modifying the value of the field D as 1 is sent to R1 and R3. When the Hello message of modifying the value of the field D as 1 is sensed and received, R1 and R3 determine that the control plane of R2 is not malfunctioned but disables/exits the Hello detection function, R1 and R3 do not enable a restart timer waiting function, and continue to send the refresh message to R2 in the meanwhile. When R2 re-enables the Hello detection of GR, R2 initiates a Hello message in a normal format (i.e., the Hello message that the value of the field D is 0) to R1 and R3 initiatively, so as to build a normal Hello relationship with R1 and R2. Similarly, R2 may also determine whether the control plane of R1 or R3 is not malfunctioned but exits the Hello detection function according to the value of the field D sent by R1 or R3, to determine whether to continue to send the refresh message to R1 or R3, so as to prevent aging of R2.

According to the embodiment, by analyzing whether the control plane of the first node exits the Hello detection function due to malfunction, the specific identification is added to the first interaction information in the case that the control plane of the first node is not malfunctioned but exits the Hello detection function, the specific identification being used to indicate the state that the control plane is not malfunctioned but exits the Hello detection function; and the first interaction information is sent to the second node neighboring the first node, so that the second node determines that the control plane of the first node is not malfunctioned but exits the Hello detection function via the specific identification, and continues to send the refresh message to the first node. When the first interaction information sent by the first node received includes the specific identification, the second node determines that the control plane of the first node is not malfunctioned but exits the Hello detection function, and continues to send the refresh message to the first node, so as to prevent the first node from initiating a restart timer and stop sending the refresh message to the first node, so that aging of the first node is avoided.

Figure 5:
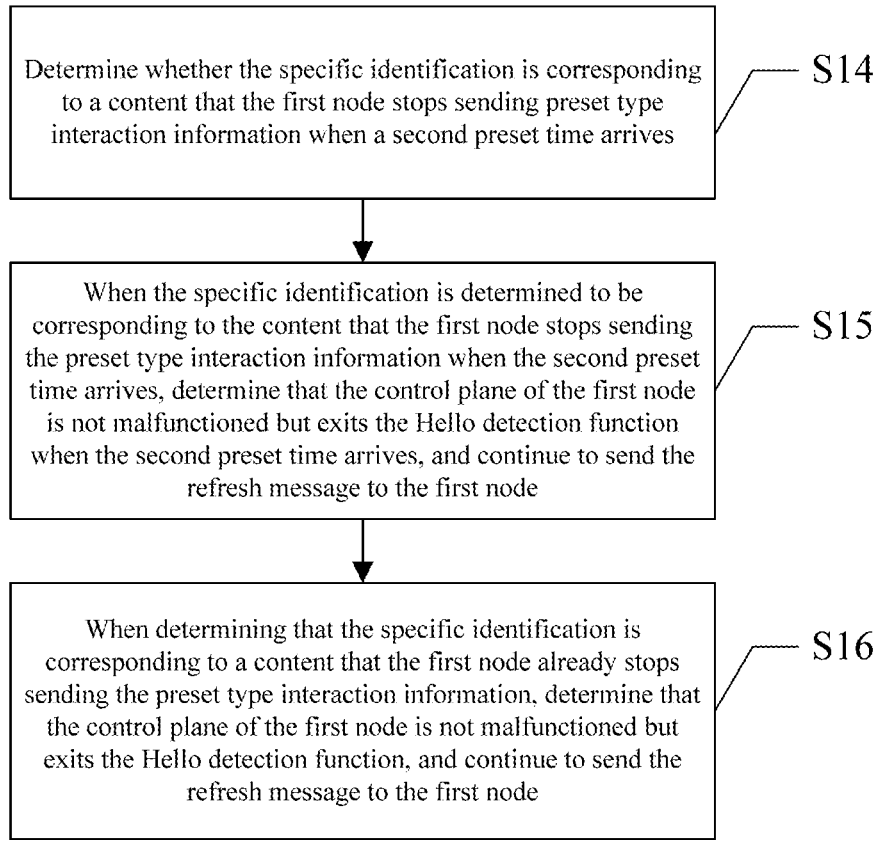
FIG. 5 is a detailed flow chart illustrating step S12 as shown in FIG. 1.

Furthermore, referring to FIG. 5, the steps of determining that the control plane of the first node is not malfunctioned but exits the Hello detection function, and continuing to send the refresh message to the first node further include the following steps.

In step S14, it is determined whether the specific identification is corresponding to a content that the first node stops sending the preset type interaction information when a second preset time arrives.

In step S15, when the specific identification is determined to be corresponding to the content that the first node stops sending the preset type interaction information when the second preset time arrives, the control plane of the first node is determined to be not malfunctioned but exits the Hello detection function when the second preset time arrives, and the refresh message is continued to be sent to the first node.

In step S16, when it is determined that the specific identification is corresponding to a content that the first node already stops sending the preset type interaction information, the control plane of the first node is determined to be not malfunctioned but exits the Hello detection function, and the refresh message is continued to be sent to the first node.

In the embodiment, when the first interaction information sent from the first node and including the specific identification is received, the second node determines whether the specific identification is corresponding to the content that the first node already stops sending the preset type interaction information when the second preset time arrives, or corresponding to the content that the first node already stops sending the preset type interaction information. When it is determined that the specific identification is corresponding to the content that the first node stops sending the preset type interaction information when the second preset time arrives, the second node starts timing; when the second preset time arrives and the preset type interaction information is not received from the first node, the second node determines that the control plane of the first node is not malfunctioned but exits the Hello detection function, and continues to send the refresh message to the first node. When it is determined that the specific identification is corresponding to the content that the first node already stops sending the preset type interaction information, the second node determines that the control plane of the first node is not malfunctioned but exits the Hello detection function, and continues to send the refresh message to the first node. The second preset time may be a proper time interval set by a user like 30 s, 1 Min, etc. By analyzing the content corresponding to the specific identification, the technical problem that the second node stops sending the refresh message to the first node when the control plane of the first node is malfunctioned can be effectively prevented, so as to effectively avoid aging of the first node.

Figure 6:
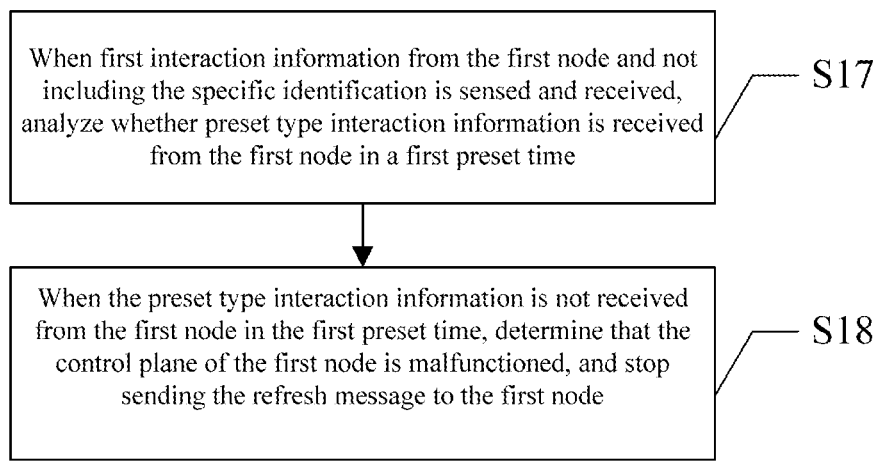
FIG. 6 is a flow chart illustrating the method for preventing network node aging according to a second embodiment of the present disclosure.

FIG. 6 is a flow chart illustrating the method for preventing network node aging according to a second embodiment of the present disclosure.

Based on the first embodiment above, the method further includes the following steps.

In step S17, when the first interaction information from the first node and not including the specific identification is sensed and received, it is analyzed whether preset type interaction information from the first node is received in a first preset time.

In step S18, when the preset type interaction information is not received from the first node in the first preset time, the control plane of the first node is determined to be malfunctioned, and sending the refresh message to the first node is stopped.

In the embodiment, when the first interaction information from the first node and not including the specific identification is sensed and received, i.e., the first node does not exit the Hello detection function, the second node analyzes whether the preset type interaction information is sensed and received from the first node in the first preset time, i.e., the second node analyzes whether the information of the control plane state is received from the first node in the first preset time. The preset type interaction information is corresponding to a content of the control plane state, wherein the content of the control plane state includes such content like a restart time of the control plane, a recovery time of the control plane, and differs with different states of the control plane. The first preset time is a period for sending the preset type interaction information between the nodes, and may be any proper time interval set by a user like 10 s, 20 s, etc. Taking the first node for example, when the control plane of the first node is restarted, the content of the control plane state of the first node includes a recovery time, and a content restart time of the content of the control plane state of the first node when the control plane is under a normal running state. When the preset type interaction information is not sensed and received from the first node in the first preset time, the second node determines that the control plane of the first node is malfunctioned, or the control plane of the first node is under a restart state, and stops sending the refresh message to the first node. After the control plane is restarted, the first node sends the preset type interaction information to the neighboring second node thereof, to inform the neighboring second node thereof of the information of the control plane state of the first node, and restore the information of the control plane of the first node through the second node.

Figure 7:
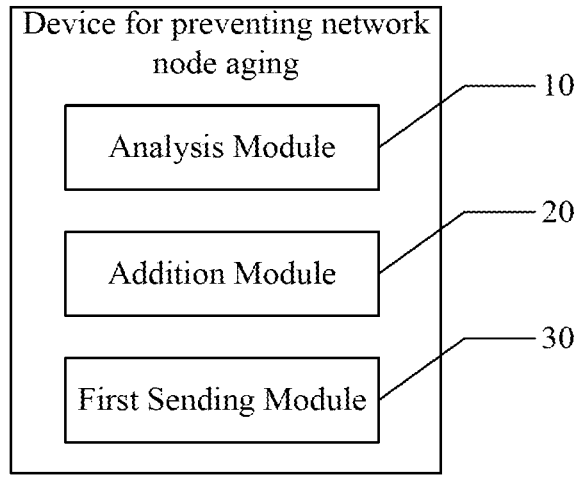
FIG. 7 is a block diagram illustrating functional modules in a device for preventing network node aging according to a first embodiment of the present disclosure.

FIG. 7 is a block diagram illustrating functional modules of a device for preventing network node aging according to a first embodiment of the present disclosure. The device includes an analysis module 10, an addition module 20 and a first sending module 30.

The analysis module 10 is configured to analyze whether a control plane of a first node exits a Hello detection function due to malfunction.

In the embodiment, a network is composed of each node, and various interconnected nodes are mutually neighboring.

When each node has a GR function, and can send a Hello message to a neighboring node equipment thereof through enabling the Hello detection function, so as to inform the neighboring node equipment of a restart time thereof. When a control plane of a certain node is restarted, the information of the control plane before restart can be restored through the neighboring node equipment, so as to ensure that the flow traffic is forwarded. The first node, before sending the interaction information to the neighboring second node thereof, analyzes whether malfunction occurs and the Hello detection function is exited.

The addition module 20 is configured to add a specific identification to first interaction information in the case that the control plane of the first node is not malfunctioned but exits the Hello detection function, wherein the specific identification is used to indicate the state that the control plane is not malfunctioned but exits the Hello detection function.

The first sending module 30 is configured to send the first interaction information to a second node neighboring the first node, so that the second node determines that the control plane of the first node is not malfunctioned but exits the Hello detection function via the specific identification, and continues to send a refresh message to the first node.

In the embodiment, when the control plane of the first node is not malfunctioned but exits the Hello detection function, the first node builds the first interaction information including the specific identification, and the specific identification is corresponding to the state that the control plane of the first node is not malfunctioned but exits the Hello detection function, and is corresponding to the state that the control plane of the first node is not malfunctioned but exits the Hello detection function herein. The first interaction information including the specific identification is sent to a neighboring second node equipment thereof. When the first interaction information from the first node is sensed and received, the second node analyzes whether the first interaction information includes the specific identification, i.e., analyzes whether the control plane of the first node equipment sending the first interaction information is not malfunctioned but exits the Hello detection function.

When the first interaction information includes the specific identification, i.e., the control plane of the first node is not malfunctioned but exits the Hello detection function, the second node continues to send the refresh message to the first node, so as to prevent the aging of the first node. The second node may either be one neighboring equipment of the first node, or may include multiple neighboring equipments of the first node.

Figure 8:
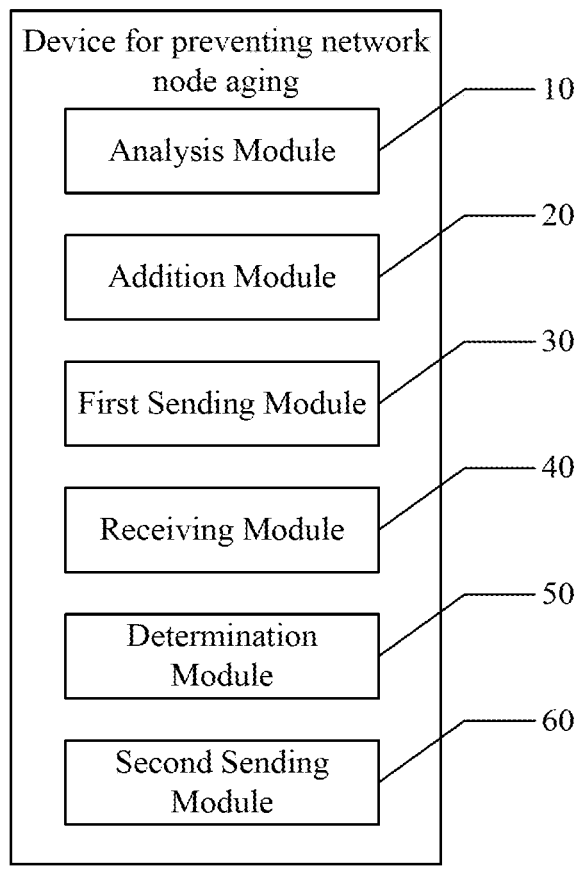
FIG. 8 is a block diagram illustrating functional modules in the device for preventing network node aging according to a second embodiment of the present disclosure.

The embodiment of the present disclosure provides a second embodiment of the device for preventing network node aging. Referring to FIG. 8, the device may further include a receiving module 40, a determination module 50 and a second sending module 60.

The receiving module 40 is configured to receive second interaction information from a third node and including the specific identification.

The determination module 50 is configured to determine that a control plane of a third node is not malfunctioned but exits the Hello detection function according to the second interaction information.

The second sending module 60 is configured to continue to send the refresh message to the third node, the specific identification being used to indicate the state that the control plane of the third node is not malfunctioned but exits the Hello detection function herein. The third node may either be other neighboring node of the second node excluding the second node, or the second node. The second sending module 60 and the first sending module 30 may either be the same, or different respectively.

The technical solutions of the embodiment of the present disclosure are described hereinafter with reference to specific application examples hereinafter.

FIG. 2 is a network structure composed of three nodes including R1, R2 and R3, where R1, R2 and R3 all have the GR function, R1 and R2 are neighboring node equipment to each other, while R2 and R3 are neighboring node equipment to each other. R1 and R2, as well as R2 and R3 inform the restart time of the respective control plane of the opposite node through sending preset type interaction information at an interval of a first preset time. When the control plane of R2 is restarted, the information of the control plane before restart may be restored through the neighboring node equipment R1 and R3. When the control plane of R2 is not malfunctioned but the Hello detection function is disabled, R2 builds one interaction information, and adds a specific identification to the interaction information, the specific identification corresponding to a content that the Hello detection function is disabled. Taking the interaction information as a Hello message for example, a format of an RSVP Hello message for interaction between R1 and R2 as well as between R2 and R3 is: <Hello Message>::=<Common Header>[<INTEGRITY>]<HELLO>[<RESTART_CAP>][CAPABILITY]. The Hello message includes a Capability (capability) object. FIG. 3 is a schematic diagram illustrating a standard format of the Capability object. FIG. 4 is a schematic diagram illustrating an extended format of the Capability object. One Bit field D is reserved for the extended Capability object. In a normal Hello message, the default value of the field D is 0. When the R2 disables/exits the Hello detection function, the value of the field D in the Capability object of the Hello message is modified as 1, and a Hello message of modifying the value of the field D as 1 is sent to R1 and R3. When the Hello message of modifying the value of the field D as 1 is sensed and received, R1 and R3 determine that the control plane of R2 is not malfunctioned but disables/exits the Hello detection function, R1 and R3 do not enable a restart timer waiting function, and continue to send the refresh message to R2 in the meanwhile. When R2 re-enables the Hello detection of GR, R2 initiates a Hello message in a normal format (i.e., the Hello message that the value of the field D is 0) to R1 and R3 initiatively, so as to build a normal Hello relationship with R1 and R2. Similarly, R2 may also judge whether the control plane of R1 or R3 is not malfunctioned but exits the Hello detection function according to the value of the field D sent by R1 or R3, to determine whether to continue to send the refresh message to R1 or R3, so as to prevent aging of R2.

According to the embodiment, by analyzing whether the control plane of the first node exits the Hello detection function due to malfunction, the specific identification is added to the first interaction information in the case that the control plane of the first node is not malfunctioned but exits the Hello detection function, the specific identification being used to indicate the state that the control plane is not malfunctioned but exits the Hello detection function; and the first interaction information is sent to the second node neighboring the first node, so that the second node determines that the control plane of the first node is not malfunctioned but exits the Hello detection function via the specific identification, and continues to send the refresh message to the first node. When the first interaction information sent by the first node received includes the specific identification, the second node determines that the control plane of the first node is not malfunctioned but exits the Hello detection function, and continues to send the refresh message to the first node, so as to prevent the first node from initiating a restart timer and stop sending the refresh message to the first node, so that aging of the first node is avoided.

When the device for preventing node aging is the device for preventing node aging in the second node, the determination module 50 is also configured to determine whether the specific identification is corresponding to a content that the first node stops sending the preset type interaction information when a second preset time arrives.

The second sending module 60 is further configured to determine that the specific identification is corresponding to the content that the first node stops sending the preset type interaction information when the second preset time arrives, determine that the control plane of the first node is not malfunctioned but exits the Hello detection function when the second preset time arrives, and continues to send the refresh message to the first node.

When it is determined that the specific identification is corresponding to a content that the first node already stops sending the preset type interaction information, the control plane of the first node is determined to be not malfunctioned but exits the Hello detection function, and the refresh message is continued to be sent to the first node.

In the embodiment, when the first interaction information sent from the first node and including the specific identification is received, the second node determines whether the specific identification is corresponding to the content that the first node stops sending the preset type interaction information when the second preset time arrives, or corresponding to the content that the first node has stopped sending the preset type interaction information. When it is determined that the specific identification is corresponding to the content that the first node stops sending the preset type interaction information when the second preset time arrives, the second node starts timing; when the second preset time arrives and the preset type interaction information is not received from the first node, the second node determines that the control plane of the first node is not malfunctioned but exits the Hello detection function, and continues to send the refresh message to the first node. When it is determined that the specific identification is corresponding to the content that the first node already stops sending the preset type interaction information, the control plane of the first node is determined to be not malfunctioned but exits the Hello detection function, and the refresh message is continued to be sent to the first node. The second preset time may be a proper time interval set by a user, like 30 s, 1 Min, or the like. By analyzing the content corresponding to the specific identification, the technical problem that the second node stops sending the refresh message to the first node when the control plane of the first node is malfunctioned can be effectively prevented, so as to effectively avoid aging of the first node.

The analysis module 10 may also be configured to analyze whether preset type interaction information is received from the first node in a first preset time when the first interaction information from the first node and not including the specific identification is sensed and received.

The second sending module 60 may also be configured to determine that the of the first node is malfunctioned and stop sending the refresh message to the first node when the preset type interaction information is not received from the first node in the first preset time.

In the embodiment, when the first interaction information from the first node and not including the specific identifi-cation is sensed and received, i.e., the first node does not exit the Hello detection function, the second node analyzes whether the preset type interaction information from the first node is sensed and received in the first preset time, i.e., the second node analyzes whether the information of the control plane state is received from the first node in the first preset time. The preset type interaction information is corresponding to a content of the control plane state, where the content of the control plane state includes such content like a restart time of the control plane, a restoration time of the control plane, and differs with different states of the control plane. The first preset time is a period for sending the preset type interaction information between the nodes, and may be any proper time interval set by a user like 10 s, 20 s, etc. Taking the first node for example, when the control plane of the first node is restarted, the content of the control plane state of the first node includes a recovery time, and a content restart time of the content of the control plane state of the first node when the control plane is under a normal running state. When the preset type interaction information is not sensed and received from the first node in the first preset time, the second node determines that the control plane of the first node is malfunctioned, or the control plane of the first node is under a restart state, and stops sending the refresh message to the first node. After the control plane is restarted, the first node sends the preset type interaction information to the neighboring second node thereof, to inform the neighboring second node thereof of the information of the control plane state of the first node, and restore the information of the control plane of the first node through the second node.

The embodiment of the present disclosure also provides a system for preventing node aging. The system includes multiple nodes, and the node in the system includes the device for preventing network node aging in the foregoing embodiments. For example, the system includes two nodes: a first node and a second node, wherein both the first node and the second node include: an analysis module 10, an addition module 20, a first sending module 30, a receiving module 40, a determination module 50 and a second sending module 60. Functions of each module are as seen in the specific description of the device for preventing node aging above, and will not be elaborated herein.

The embodiment of the present disclosure also provides a computer program including program instructions which, when executed by device for preventing network node aging, causes the device to perform the method above.

The embodiment of the present disclosure also provides a carrier carrying the foregoing computer program.

The number of the above embodiment is merely provided for description, but does not represent the strengths of the embodiments. Through the descriptions of the embodiments above, those skilled in the art will clearly understand that the foregoing embodiment methods may be implemented by software and a required common hardware platform. It is certainly that the method may also be implemented by hardware, while the former is a preferred embodiment in many cases. Based on such understanding, the technical solution of the present disclosure essentially, or the part contributing to the prior art, or the part of the technical solution may be implemented in the form of a software product. The computer software product is stored in a storage medium (such as an ROM/RAM, a magnetic disk, an optical disk), and includes several instructions for instructing a terminal device (which may be a mobile phone, a computer, a server, or a network device so on) to execute the method according to each embodiment of the present disclosure.

The above is merely preferred embodiments of the present disclosure, but is not intended to limit the patent scope of the present disclosure. Any equivalent structure or equivalent flow transformation figured out using the description and drawing contents of the present disclosure, or the description and drawing contents of the present disclosure directly or indirectly applied in other related technical fields shall all be similarly included in the patent protection scope of the present disclosure.

INDUSTRIAL APPLICABILITY

Through the embodiments of the present disclosure, enabling of the restart timer is avoided in the case that the first node is not malfunctioned but exits the Hello detection function, and sending the refresh message to the first node is stopped, so as to avoid aging of the first node.

What is claimed is:

1. A method for preventing network node aging, comprising:
analyzing whether a control plane of a first node exits a Hello detection function due to malfunction;
adding a specific identification to first interaction information when the control plane of the first node is not malfunctioned but exits the Hello detection function, the specific identification being used to indicate that the control plane is not malfunctioned but exits the Hello detection function; and
sending the first interaction information to a second node neighboring the first node, so that the second node determines that the control plane of the first node is not malfunctioned but exits the Hello detection function via the specific identification, and continues to send a refresh message to the first node.

2. The method for preventing network node aging according to claim 1, further comprising:
receiving second interaction information from a third node and comprising the specific identification;
determining that a control plane of the third node is not malfunctioned but exits the Hello detection function according to the second interaction information; and
continuing to send the refresh message to the third node.

3. The method for preventing network node aging according to claim 1, wherein after the sending the first interaction information to the second node neighboring the first node, the method further comprises:
receiving the first interaction information comprising the specific identification;
determining that the control plane of the node is not malfunctioned but exits the Hello detection function according to the first interaction information; and
continuing to send the refresh message to the first node.

4. The method for preventing network node aging according to claim 1, further comprising:
when the first interaction information not comprising the specific identification is sensed and received, analyzing whether preset type interaction information is received from the first node in a first preset time; and
when the preset type interaction information is not received from the first node in the first preset time, determining that the control plane of the first node is malfunctioned, and stopping sending the refresh message to the first node.

5. The method for preventing network node aging according to claim 4, wherein after the step of determining that the control plane of the first node is malfunctioned, and stopping sending the refresh message to the first node, the method further comprises:
when the preset type interaction information is sensed and received from the first node, restoring to send the fresh message to the first node.

6. The method for preventing network node aging according to claim 1, wherein the determining that the control plane of the first node is not malfunctioned but exits the Hello detection function and continuing to send the refresh message to the first node comprise:
determining whether the specific identification is corresponding to a content that the first node stops sending the preset type interaction information when a second preset time arrives; and
determining that the specific identification is corresponding to the content that the first node stops sending the preset type interaction information when the second preset time arrives, determining that the control plane of the first node is not malfunctioned but exits the Hello detection function when the second preset time arrives, and continuing to send the refresh message to the first node.

7. The method for preventing network node aging according to claim 6, wherein after the determining whether the specific identification is corresponding to a content that the first node stops sending the preset type interaction information when a second preset time arrives, the method further comprises:
when determining that the specific identification is corresponding to a content that the first node already stops sending the preset type interaction information, determining that the control plane of the first node is not malfunctioned but exits the Hello detection function, and continuing to send the refresh message to the first node.

8. A system for preventing network node aging, comprising at least two nodes, any of the nodes of the system comprising a device for preventing network node aging the device comprising:
a processor; and
a memory configured to store instructions executable by the processor;
wherein the processor is configured to perform:
analyzing whether a control plane of a first node exits a Hello detection function due to malfunction;
adding a specific identification to first interaction information when the control plane of the first node is not malfunctioned but exits the Hello detection function, the specific identification being used to indicate that the control plane is not malfunctioned but exits the Hello detection function; and
sending the first interaction information to a second node neighboring the first node, so that the second node determines that the control plane of the first node is not malfunctioned but exits the Hello detection function via the specific identification, and continues to send a refresh message to the first node.

9. A device for preventing network node aging, comprising:
a processor; and
a memory configured to store instructions executable by the processor;
wherein the processor is configured to perform:
analyzing whether a control plane of a first node exits a Hello detection function due to malfunction;

adding a specific identification to first interaction information when the control plane of the first node is not malfunctioned but exits the Hello detection function, the specific identification being used to indicate that the control plane is not malfunctioned but exits the Hello detection function; and sending the first interaction information to a second node neighboring the first node, so that the second node determines that the control plane of the first node is not malfunctioned but exits the Hello detection function via the specific identification, and continues to send a refresh message to the first node.

10. The device for preventing network node aging according to claim 9, the processor is further configured to perform:

receiving second interaction information from a third node and comprising the specific identification;

determining that a control plane of the third node is not malfunctioned but exits the Hello detection function according to the second interaction information; and continuing to send the refresh message to the third node.

11. A non-transitory computer-readable storage medium having stored therein instructions that, when executed by a processor of a network node, causes the network node to perform a method for preventing network node aging, comprising:

analyzing whether a control plane of a first node exits a Hello detection function due to malfunction;

adding a specific identification to first interaction information when the control plane of the first node is not malfunctioned but exits the Hello detection function, the specific identification being used to indicate that the control plane is not malfunctioned but exits the Hello detection function; and sending the first interaction information to a second node neighboring the first node, so that the second node determines that the control plane of the first node is not malfunctioned but exits the Hello detection function via the specific identification, and continues to send a refresh message to the first node.

* * * * *